United States Patent [19]

Watson et al.

[11] Patent Number: 4,667,103
[45] Date of Patent: May 19, 1987

[54] UNIVERSAL WAVEFRONT SENSOR APPARATUS

[75] Inventors: John T. Watson, Lexington; Robert F. Lucy, Andover, both of Mass.

[73] Assignee: The United States of America as represented by the Secretary of the Air Force, Washington, D.C.

[21] Appl. No.: 763,576

[22] Filed: Aug. 8, 1985

[51] Int. Cl.4 ............................ G01B 9/00; G01J 5/08
[52] U.S. Cl. .................................. 250/332; 250/330; 250/334; 356/124
[58] Field of Search ............... 250/334, 332, 330, 351, 250/201; 356/124

[56] References Cited

U.S. PATENT DOCUMENTS

| | | | |
|---|---|---|---|
| 3,923,400 | 12/1975 | Hardy | 356/353 |
| 4,113,388 | 9/1978 | Gates et al. | 356/356 |
| 4,154,532 | 5/1979 | Emmerich | 356/152 |
| 4,239,392 | 12/1980 | Pohle | 356/354 |
| 4,319,839 | 3/1982 | Durran | 356/153 |
| 4,441,019 | 4/1984 | Hardy | 250/201 |
| 4,620,790 | 11/1986 | Hufnagel | 356/124 |

OTHER PUBLICATIONS

Thomas J. Brown, "Development of an Earth Resource Pushbroom Scanner Utilizing a 90-Element 8-14 Micrometer (Hg,Cd)Te array" Proceedings of the Society of Photo-Optical Instrumentation Engineers, vol. 226 (1980), pp. 18-37.
Richard A. Chapman et al., "Monolithic HgCdTe Charge Transfer Device Infrared Imaging Arrays" IEEE Transactions on Electron Devices, vol. ED-27, No. 1 (Jan. 1980), pp. 134-145.

Primary Examiner—Carolyn E. Fields
Assistant Examiner—Constantine Hannaher
Attorney, Agent, or Firm—William Stepanishen; Donald J. Singer

[57] ABSTRACT

A wavefront sensor apparatus for a large optical system, such as a telescope, having a reticle with at least one slit therein to provide image signatures for various portions of the aperture to an array of infrared sensor cells. The time differences between the image signatures represents relative image displacement caused by the wavefront slope variation in the actual wavefront.

8 Claims, 6 Drawing Figures

4,667,103

UNIVERSAL WAVEFRONT SENSOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an optical system, and in particular to a universal wavefront sensor apparatus.

A wavefront sensor is needed to provide image control for large active optical systems in space. If the optical system is continuously pointing at the ground, it is appropriate to use ground imagery as a means to sense wavefront errors which are introduced by the optics within the optical system. Furthermore, since active optics image control is both a day and night need, the use of infrared imagery is also appropriate.

Therefore, it is clear that there exists a need for an infrared wavefront sensor which will be applicable to large optical systems that are operated in space. The required wavefront sensor should work on cloud detail or ground scene imagery, and use appropriate components so that it can operate in the infrared region and thereby be functional at all times.

The optical systems which are being considered for use in space, are extremely large. These optical systems cannot be expected to stay in focus or even in alignment without some type of sensor to determine the configuration errors and the mechanical adjustments which will be required to remove them. It has been shown that thermal expansion terms may necessitate system readjustment, and sometimes it is necessary to adjust as often as every 10 minutes, to prevent significant quality deterioration. In addition, the warping of structural materials with age could require system readjustment even if there were no temperature effects.

In the prior art, two radically different techniques for controlling image configuration errors in large optical systems may be utilized:

1. Measure absolute distances to control points to maintain exact configuration,
2. Use a wavefront sensor to determine wavefront shape.

The first technique relies on complete internal control of the optical system, while the second scheme relies on the imagery which is produced by the optical system and on the knowledge of the design characteristics of the optical system. An available optical position sensor (OPS), which can measure absolute distance, has been demonstrated to work well over a 10 meter path in a straight-through configuration. However, the following formidable problems yet remain to be solved. These problems are: (1) making a three-headed triangulation configuration, (2) providing precise beam aiming over a large solid angle, and (3) providing optical retro devices that are reliable in position to submicron tolerances which would be required for segmented mirrors.

The use of a wavefront sensor that can determine wavefront errors and is capable of using 12th magnitude stars for measurement has been demonstrated. It can theoretically work with 14th- magnitude stars when a two-stage light intensifier is supplied. This sensor, in combination with edge sensors for segmented mirrors, can control all significant errors in the optical system when star fields are available as sources. When star sources are not available, the wavefront sensor does not work.

Since a wavefront sensor is key to system quality control, and since narrow angle systems pointing at the ground do not have star fields available, it appears appropriate to look at wavefront sensor schemes that could work on scene imagery.

Another real scene device proposed analyzes intensity distributions in a scene image and by trial and error attempts to find wavefront errors that have affected the image. The process is extremely slow, requiring long integration times to produce a good signal-to-noise ratio in the data. The computational burden is extreme, requiring approximately 1 hour of a dedicated PDP 1170 computer for solution. The method is applicable only to long staring systems because of data gathering time. One other method (application Ser. No. 590,612, now abandoned) has been developed for finding the wavefront from extended daytime scenes. It works well but only during daylight hours.

The present invention uses principles much the same as those used by the daytime scene sensor. The sensor can work on cloud detail or ground infrared scene imagery, so that it can work well at all times. The measurement precision as limited by noise is calculated to be 0.03- micron wavefront error for a 0.1-sec sampling time. The wavefront sensor will operate in a variety of adverse conditions such as, on extended scene detail, daytime or nighttime or on cloud detail. The wavefront sensor apparatus may be utilized in large, satellite borne optical systems for control of system errors.

SUMMARY OF THE INVENTION

The present invention utilizes a wavefront sensor apparatus to measure the relative image displacement errors which arise from wavefront slope errors. Different portions of an aperture of an optical telescope are isolated by imaging the aperture on an array of sensors so that each sensor sees light only from a particular portion of the aperture. When the sensor array is scanned, the time differences between the image signatures at each array element indicates the image displacement which is caused by the wavefront slope error.

It is one object of the present invention, therefore, to provide an improved wavefront sensor apparatus.

It is another object of the invention to provide an improved wavefront sensor apparatus to determine the wavefront shape from the image formed by an optical telescope.

It is another object of the invention to provide an improved wavefront sensor apparatus to measure relative image displacement at the aperture of an optical telescope.

It is another object of the invention to provide an improved wavefront sensor apparatus to determine wavefront slope error.

It is another object of the invention to provide an improved wavefront sensor apparatus which will operate both at day and at night.

It is another object of the invention to provide an improved wavefront sensor apparatus which will operate when the image is either a point source or a scene.

DESCRIPTION OF THE PREFERRED EMBODIMENT

Figure 1:
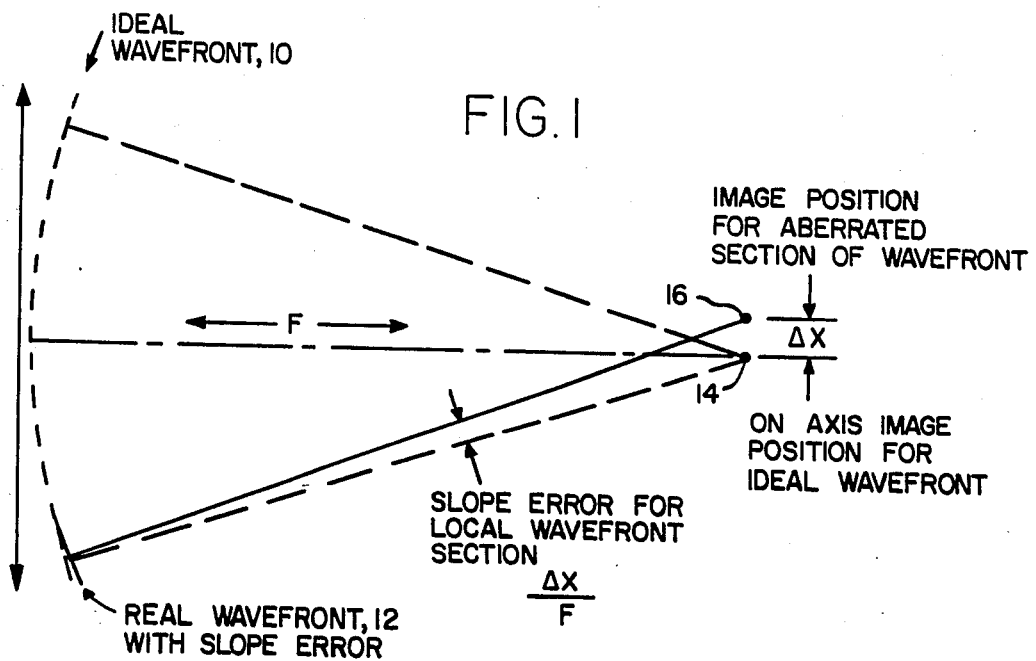
FIG. 1 is a schematic diagram of the use of image displacement ($\Delta X$) to determine wavefront slope error.

Referring now to FIG. 1, there is shown a schematic diagram of the relationship between image displacement and the wavefront slope error. The ideal wavefront 10 is represented by a dashed line. The real waveform 12 which is represented by a solid line is shown with a slope error. The slope error is the deviation of the real waveform 12 from the ideal wavefront 10. For the ideal waveform 10, the image is formed at the point 14 which is at a distance F along the centerline 40 the ideal wavefront. The image position from the real wavefront 12 with its slope error is formed at point 16. The difference $\Delta X$ between the point 14 and the point 16 represents the difference between the on axis image position for the ideal wavefront and the image position for the aberrated section of the real wavefront.

The above operation is the principle upon which an operational wavefront sensor can be made from any device that can measure relative image displacement errors arising from wavefront slope errors. In FIG. 1, the relationship between image displacement and wavefront slope error is shown and it does not matter whether the image that is formed is a point source or a scene. The image displacement will be the same, and will be dependent only on the local slope error in the wavefront.

Figure 2:
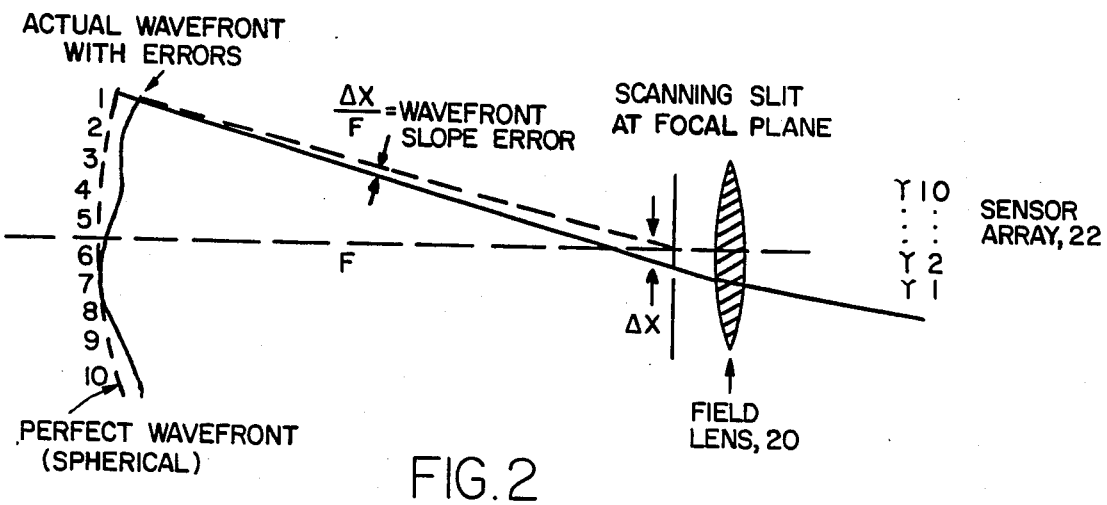
FIG. 2 is a schematic diagram of the universal wavefront sensor apparatus according to the present invention.

In order to provide an operational wavefront sensor apparatus it is necessary only that different portions of the optical aperture can be isolated by imaging the aperture onto an array of sensor cells so that each sensor cell sees light from a different part of the aperture. This is accomplished by placing a field lens 20 behind the focal plane, as shown in FIG. 2. Sensor cell No. 1 in the sensor array 22 senses only light that comes from section No. 1 of the aperture. The light rays from other portions of the aperture are directed to the other cells in the sensor array 22.

In order to locate the image which is formed through aperture section 1, a single slit 24 or multiple slits are introduced at the focal plane to scan the image and provide its signature to sensor cell 1. At the same time, the image signatures for the image which are formed by other parts of the aperture are provided to the other sensor cells, 1 through 10 in the sensor array 22. When there is no wavefront slope error, all the image signatures will occur simultaneously, indicating no relative image displacements in the focal plane. Time differences between the image signatures would indicate the image displacements caused by wavefront slope error. The wavefront slope error sensor apparatus operates on this principle. The image may be scanned by the slit 24 or the image may be moved over the slit in order to produce the a-c detector signal that is the scene signature. The scanning may be achieved by either (1) using a fixed slit or slits and using the flight motion of a space-/air vehicle to generate image motion, (2) using a scanning mirror in front of the objective lens to pan the scene, or (3) using a moving slit pattern such as a chopper wheel. Because slope error must be determined for all azimuths, reticle lines for slope errors in the "X" direction and reticle lines for slope errors in the "Y" direction must be provided.

Figure 3A:
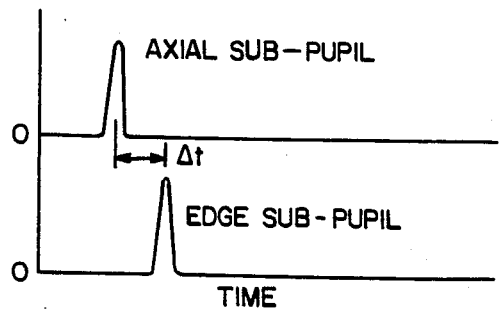
FIG. 3a is a graphical representation of point source signals as viewed through a single slit.
Figure 3B:
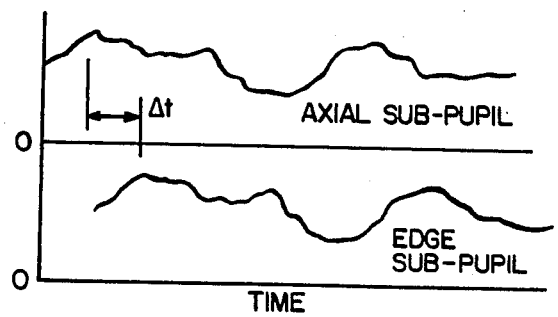
FIG. 3b is a graphical representation of real scene signals as viewed through a single slit.

Turning now to FIGS. 3a and 3b, there is shown a graphical representation of the image amplitude versus time for the image displacement of a real wavefront with a slope error. The time differences between the image signatures indicates the image displacement which is caused by the wavefront slope error. In FIG. 3a there is shown the time difference between an axial sub-pupil or section and an edge sub-pupil for point source signals as seen through a single slit. In FIG. 3b, there is shown the comparison of the time difference between the real scene signals from an axial sub-pupil and an edge sub-pupil as seen through a single slit. It may be seen that the image displacement as represented by the image signal time differences from two different sections of the pupil is clearly shown.

The accuracy of the present wavefront sensor apparatus is very high since it is based on the time-tested Hartmann principle. The Hartmann test for telescope mirrors is well-known. For a perfect mirror, light from all points on the mirror should come to the same focus. By covering the mirror with a screen, in which regularly spaced holes have been cut, and then permitting the reflected light to strike a photographic plate placed near the focus, the failure of dots on the plate to be regularly-spaced indicates a fault of the mirror. The Hartmann test, however, is applicable only to point sources.

In the real scene sensor, there will be random errors that arise not only from noise in the sensor but also from slight differences in the signal caused by wavefront error. The signal differences which arise as a result of the wavefront slope errors are easy to understand. When there are large wavefront slope errors, the time shifts of image signatures are appreciable and minor errors can arise from signal truncation. The amount of this error decreases when the length of the signal increases. The measurement error disappears when the wavefront is corrected.

Another error of the same type caused by slope error displaces the image in a direction that is normal to the scan line. This causes a slight difference in image signature for different sections of the wavefront. This type of error decreases with slit length. It also disappears when the wavefront is corrected.

As long as the scan length and the slit length are appreciably greater than the focal plane displacements which are caused by wavefront slope errors, these random errors are not serious. It may be shown by calculation for a wavefront sensor apparatus with a sensor array of at least ten sensor units that the errors can be held to less than one-tenth of the measured wavefront errors. The truncation errors may even be completely removed by computation, if necessary.

The precision of the sensor as limited by noise alone can be estimated from the detectivity of the infrared (IR) cells, the system configuration, and the power density spectrum for the ground area. First, the noise equivalent temperature difference for the system is calculated from a standard relationship:

$$NE\Delta T = \frac{4(f/no.)^2 \Delta f^{\frac{1}{2}}}{A_d^{\frac{1}{2}} \eta_o \eta_a D_* W}$$

where f/no.=f/number of subpupil, approximately 20
f=the bandwidth of the signal, approximately 100
$A_d$=the detector area in cm$^2$, approximately $(0.1)^2$
$\eta_o$, $\eta_a$=the optical and atmospheric transmittances, approximately 0.5
D =detectivity (background limited) for HgCdTe), approximately $5 \times 10^{10}$
W=300° K. blackbody in the 8 to 14μm region, approximately $7 \times 10^{-5}$ W/cm$^2$/ster/°K.

This relationship is normally used when the detector is in the focal plane. However, when using a scanning slit in the focal plane, the area of the scanning slit must take into account. To do this, a factor which is the ratio of the slit area to the detector area is used. This ratio is given as follows:

$$R = \frac{A_s}{A_d}$$

where $A_s$ is the area of the slit and $A_d$ is the area of detector.

For a slit 0.3 cm $\times$ 1.0 cm, $A_s$=0.3$^2$. Then $$R = \frac{0.3}{(0.1)^2} = 30$$

Substituting all the values numbers into the original expression yields:

$$NE\Delta T = \frac{(4 \times 20^2)(100^{\frac{1}{2}})}{(3.14)(0.1)(0.5)(0.5)(5 \times 10^{10})(7 \times 10^{-5})} \tag{30}$$

$$= 0.002° K$$

Figure 4:
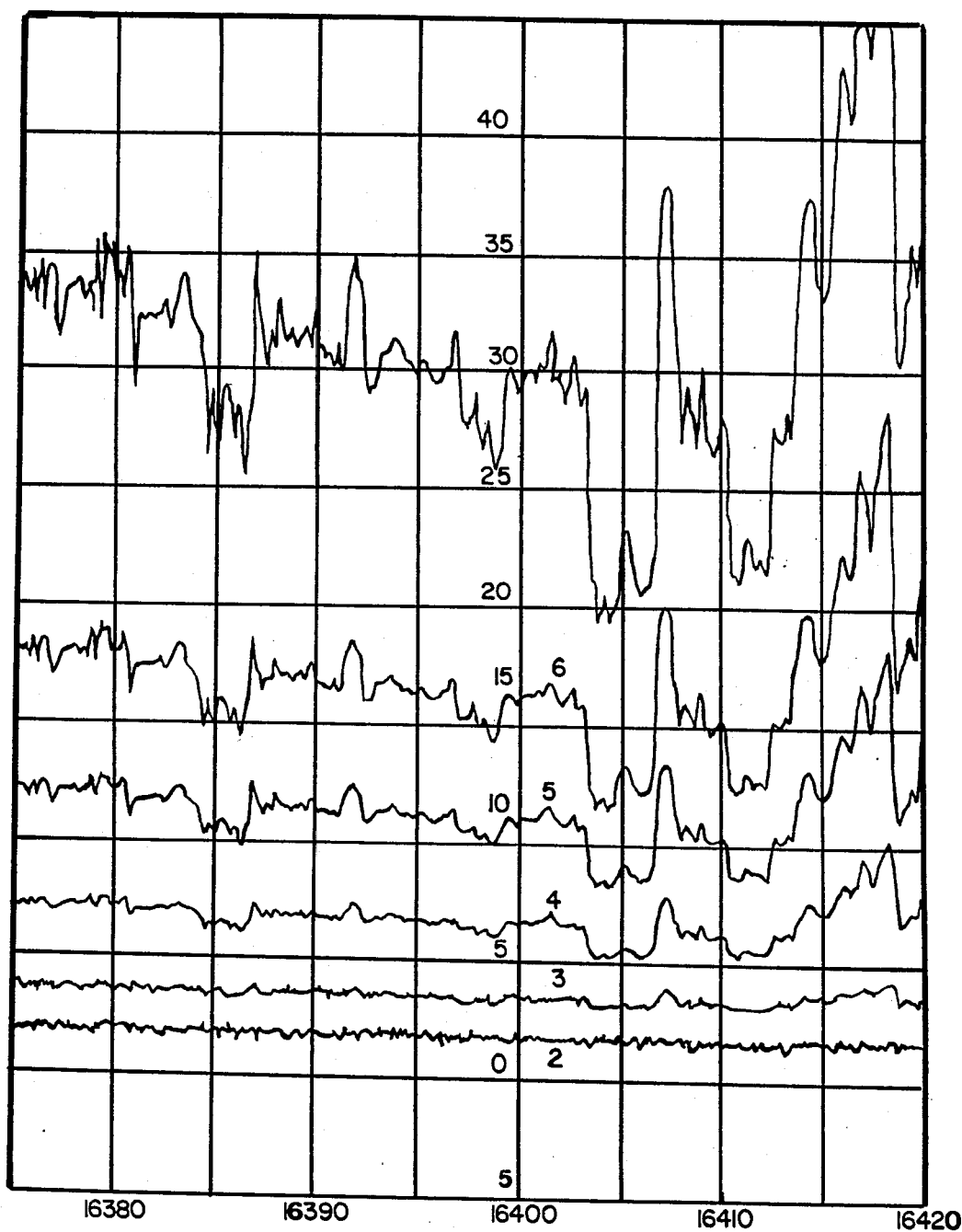
FIG. 4 is a graphical representation of the signal transition between the city and mountains at Bishop, Calif., and, FIG. 5 is a schematic diagram of the generation of infrared signal modulation from a real ground scene.

This is the value of variation in absolute temperature that will give a response equal to the noise at 100 Hz. In order to find out what fluctuations would normally be seen in an infrared scan of the earth's surface, there is shown in FIG. 4 traces of ground emission which made with an infrared (IR) detector. The graphical representations in FIG. 4 illustrate the ground image signal transistions between the city and mountain in the region of Bishop, Calif. These traces were made from a high-flying U-2 in the 4.5μm spectral region. The time scale in seconds may be converted to kilometers at 5 sec/km. To use the trace, the slit width as projected on the ground must be known. This will be taken as ½ cycle.

The slit width is 0.3 cm or 0.003 m. The focal length is 4 m $\times$ 1.3=5.2 m. The lowest altitude which would be considered for any optical system using the present wavefront sensor is 800 km (800,000 m). The projected slit width is:

$$w' = \frac{0.003 \times 800,000}{5.2}$$

$$= 460 \text{ m, or about } \frac{1}{2} \text{ km}$$

As a conservative estimate, taking into account that the percent modulation in the signal will probably be decreased by a factor of 2 when the scanning line length is considered, it would be safe to assume that a modulation with a single amplitude of 1% on the average would be available for a spatial period of twice the slit width. On this basis, the accuracy of the sensor in defining signal displacement can be predicted.

The amplitude of 1% represents a temperature difference of ¼% of the absolute temperature 300° K. or 0.75° K. This is taken as the amplitude of the average sine wave. Comparing 0.75° K. to the NE$\Delta$T of the system, the displacement of the zero crossing position of the curve which is caused by noise, can be determined. Thus, $$\Delta \phi = \frac{0.002}{0.75} = 0.0027$$

$$\Delta X = \frac{0.0027}{\pi} \times 0.3 \text{ cm} = 0.00026 \text{ cm or 2.6 } \mu m$$

This is the noise equivalent displacement for one zero crossing per cycle. If it is assumed that there are two zero crossings per cycle and that a a scan length of 10 cycles in the focal plane (6.0 cm) can be used, the precision can be improved by a factor of $(10 \times 2)^{\frac{1}{2}}=4/.5$.

The noise equivalent error is then 0.6-μm displacement in the focal plane. Converting this $\Delta X$ to wavefront slope error is accomplished by dividing by the focal length. Thus, $$\Delta \text{ slope} = \frac{\Delta X}{F.L.}$$

In order to determine the wavefront error caused by this slope error, multiply by the subpupil dimension [F.L./(f/no.).]Thus, $$\Delta OPD = \frac{\Delta X}{f/no.} = \frac{0.6}{20} = 0.03 \text{ } \mu m$$

This is the peak error in a measurement, or about 0.01 $\lambda$ at $\lambda$=2.5 μm. The response time for data taking, using 10 cycles at 100 Hz, is approximately 0.1 sec. Thus, it should be clear that the infrared (IR) wavefront sensor appears capable of providing timely wavefront measurement. It has been assumed that there will be scene detail in the 8 to 14 -μm region comparable to the data used, which came from a 4.5 μm region sensor.

Figure 5:
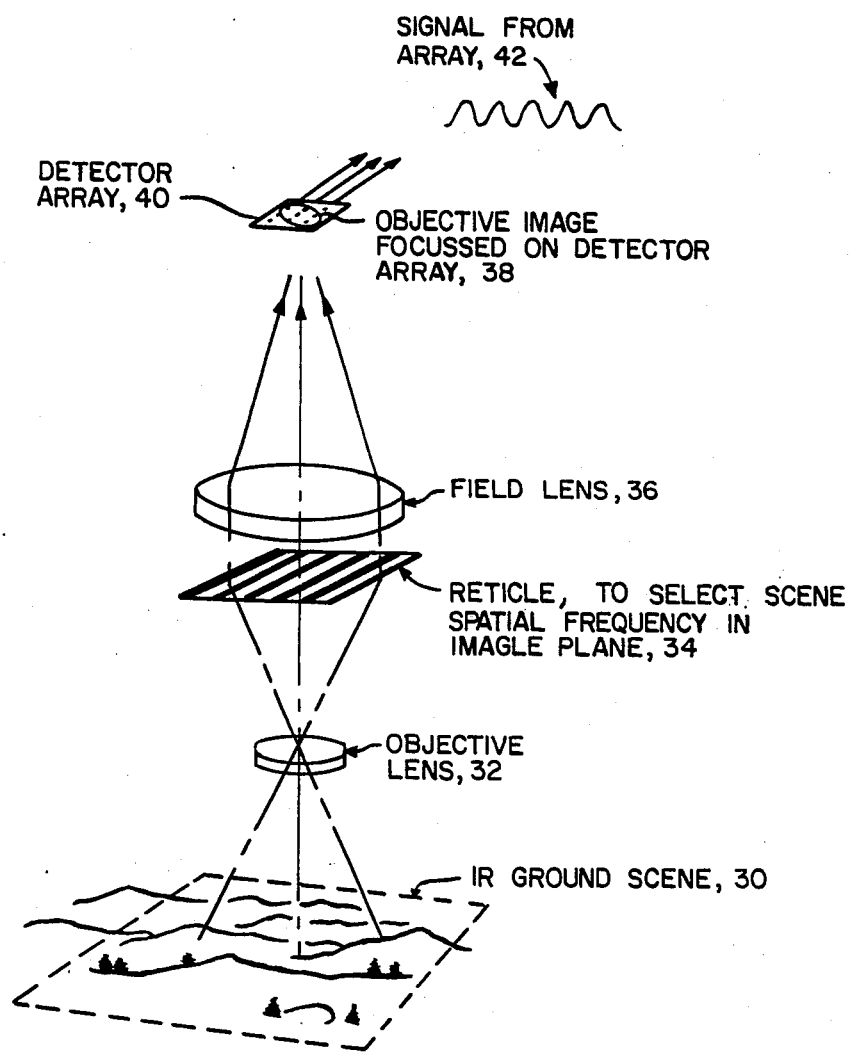

In FIG. 5 there is shown a schematic diagram of the wavefront sensor apparatus in a typical field application. A ground scene 30 which is emitting infrared signals which are focused by the objective lens 32 of an optical system such as a telescope to form an image plane at the plane of the reticle 34. The reticle 34 is utilized to select a scene spatial frequency which is focused by field lens 36 onto the detector unit 40. The reticle 34 is moved according to the principles of the present invention to provide a modulated infrared (IR) signal 42 which is sensed by the detector array 40 for detection. The output signal 42 from the detector unit 40 is a graphical representation of the image signature signal from the scanned ground scene 30. A number of image signature signals will be obtained and may be compared to determine the time differences therebetween which will be representative of the wavefront slope error.

Although the invention has been described with reference to a particular embodiment, it will be understood to those skilled in the art that the invention is capable of a variety of alternative embodiments within the spirit and scope of the appended claims.

What is claimed is:

1. A wavefront sensor apparatus for a large optical system comprising in combination:

an optical system utilizing an objective lens to form an image of a ground scene at the focal plane of said optical system, a reticle means positioned at the focal plane of said optical system to select a scene spatial frequency from said image at said focal plane, a field lens to form an image of the objective lens, an array of sensors to receive said objective image, said array of sensors comprising a predetermined number of sensor cells, each sensor cell of said array of sensors receiving a portion of said image, means for providing relative linear non-periodic motion between said ground scene and said reticle means to provide an image signature to all cells in the array, and an electrical circuit to measure time differences between the respective image signatures to determine relative image displacements caused by wavefront slope error, wavefront slope errors are the variations in slope among the different sections of the wavefront.

2. A wavefront sensor apparatus as described in claim 1 wherein said reticle means has at least two slits orthogonal to and fixed with respect to each other.

3. A wavefront sensor apparatus as described in claim 1 wherein said reticle means has a predetermined number of slits.

4. A wavefront sensor apparatus as described in claim 1 wherein said reticle means is fixed with respect to said optical system and said optical system is moving relative to said ground scene.

5. A wavefront sensor apparatus as described in claim 1 wherein said reticle means is scanned in the focal plane of said optical system.

6. A wavefront sensor apparatus as described in claim 1 wherein said array of sensors comprises more than one infrared sensor cell.

7. A wavefront sensor apparatus as described in claim 1 wherein said sensor cell comprises a mercury cadmium telluride cell.

8. A wavefront sensor apparatus as described in claim 1 wherein said sensor cell comprises an IR signal detector means which operates in the 2-14 micron region.

* * * * *